United States Patent
Hara (10) Patent No.: US 8,565,559 B2
(45) Date of Patent: Oct. 22, 2013

(54) OPTICAL DEVICE AND OPTICAL MODULATION APPARATUS

(75) Inventor: Hideo Hara, Miyagi (JP)

(73) Assignee: Advantest Corporation, Tokyo (JP)

( * ) Notice: Subject to any disclaimer, the term of this patent is extended or adjusted under 35 U.S.C. 154(b) by 9 days.

(21) Appl. No.: 13/278,156

(22) Filed: Oct. 20, 2011

(65) Prior Publication Data

US 2012/0328228 A1    Dec. 27, 2012

(30) Foreign Application Priority Data

Jun. 24, 2011   (JP) .................. 2011-140861

(51) Int. Cl.
*G02F 1/035*    (2006.01)

(52) U.S. Cl.
USPC .............................. 385/3; 359/254

(58) Field of Classification Search
USPC ............................. 385/3; 359/254
See application file for complete search history.

(56) References Cited

U.S. PATENT DOCUMENTS

| | | | | |
|---|---|---|---|---|
| 4,917,449 A | * | 4/1990 | Granestrand | 385/41 |
| 5,064,684 A | * | 11/1991 | Mir et al. | 427/555 |
| 5,895,742 A | * | 4/1999 | Lin | 430/321 |
| 6,522,793 B1 | * | 2/2003 | Szilagyi et al. | 385/2 |
| 6,558,585 B1 | * | 5/2003 | Zhang et al. | 264/1.27 |
| 6,646,776 B1 | * | 11/2003 | Cheung et al. | 359/254 |
| 7,224,878 B1 | * | 5/2007 | Wessels et al. | 385/130 |
| 7,321,702 B2 | * | 1/2008 | Akiyama et al. | 385/3 |
| 2002/0071622 A1 | * | 6/2002 | Betts et al. | 385/2 |
| 2002/0085811 A1 | * | 7/2002 | Kambe | 385/41 |
| 2002/0131745 A1 | * | 9/2002 | Azarbar | 385/129 |
| 2003/0091259 A1 | * | 5/2003 | Ooi et al. | 385/3 |

(Continued)

FOREIGN PATENT DOCUMENTS

| | | |
|---|---|---|
| JP | S63-210917 A | 9/1988 |
| JP | H05-150200 A | 6/1993 |

(Continued)

OTHER PUBLICATIONS

G.H. Jin, et al., "PLZT Film Waveguide Mach-Zehnder Electrooptic Modulator", Journal of Lightwave Technology, vol. 18, No. 6, Jun. 2000.

(Continued)

*Primary Examiner* — Charlie Peng
*Assistant Examiner* — Peter Radkowski (57) ABSTRACT

To achieve high-speed optical modulation using a crystal having a complicated refractive index characteristic with respect to applied electric field, provided is an optical device comprising a substrate; a dielectric film that is formed on the substrate and includes a first optical waveguide and a second optical waveguide that run parallel to each other; a transmission line that is formed on the dielectric film and includes a signal line arranged between the first optical waveguide and the second optical waveguide, a first bias electrode, and a second bias electrode, the first bias electrode and the second bias electrode arranged respectively in a first region that is on a side of the first optical waveguide opposite the second optical waveguide and a second region on a side of the second optical waveguide opposite the first optical waveguide; and a drive circuit section that respectively applies a first bias voltage and a second bias voltage differing from each other to the first bias electrode and the second bias electrode, and applies a control voltage that is between the first bias voltage and the second bias voltage to the signal line.

11 Claims, 6 Drawing Sheets

(56) References Cited

U.S. PATENT DOCUMENTS

| | | | |
|---|---|---|---|
| 2003/0103709 A1* | 6/2003 | Grinberg et al. | 385/2 |
| 2005/0226547 A1* | 10/2005 | Ridgway | 385/2 |
| 2006/0023288 A1* | 2/2006 | McBrien et al. | 359/245 |
| 2007/0133918 A1* | 6/2007 | Cho et al. | 385/1 |
| 2008/0069491 A1* | 3/2008 | Kissa et al. | 385/2 |
| 2012/0328227 A1* | 12/2012 | Hara et al. | 385/3 |

FOREIGN PATENT DOCUMENTS

| | | |
|---|---|---|
| JP | 2004-078002 A | 3/2004 |
| JP | 2004-109457 A | 4/2004 |
| JP | 2005-107229 A | 4/2005 |
| JP | 2006-58837 A | 3/2006 |
| JP | 2006-221111 A | 8/2006 |
| JP | 2009-008978 A | 1/2009 |
| JP | 4368004 B | 9/2009 |
| WO | 2006/016677 A1 | 2/2006 |

OTHER PUBLICATIONS

Korean Intellectual Property Office Notice of Office Action for Appl. No. 10-2011-0117754; issued Dec. 5, 2012.

"Notice of Reasons for Rejection" issued by the Japan Patent Office for application No. 2011-140861, May 21, 2013.

* cited by examiner

OPTICAL DEVICE AND OPTICAL MODULATION APPARATUS

BACKGROUND

1. Technical Field

The present invention relates to an optical device and an optical modulation apparatus.

2. Related Art

A Mach-Zehnder optical device is known that uses a lead lanthanum titanium zirconium oxide (a PbLaZrTiO-type complex oxide, shortened hereinafter to "PLZT") crystal, in which the change in refractive index with respect to applied electric field strength differs from that of $LiNbO_3$ (LN), as shown in Patent Document 1, for example. Such an optical device applies a bias voltage and a control voltage to two electrodes outside the Mach-Zehnder waveguide, to function as an optical modulator, as shown in Non-Patent Document 1, for example.

Patent Document 1: Japanese Patent Application Publication No. 2006-58837

Non-Patent Document 1: G. H. Jin, et al., "PLZT Film Waveguide Mach-Zehnder Electrooptic Modulator", Journal of Lightwave Technology, Vol. 18, No. 6, June 2000

This optical device applies a high-speed control signal to the two electrodes outside the Mach-Zehnder waveguide. In this case, it is necessary to provide a plurality of bias tees, additional circuits, and differential signal drivers, for example, resulting in a complicated control circuit. Furthermore, in this case, the electrode within the Mach-Zehnder optical waveguide functions as a GND, and therefore there are problems involved in designing the electrode such as, when a high-frequency electric field is applied, the surface area of the electrode is insufficient for achieving the GND function.

SUMMARY

Therefore, it is an object of an aspect of the innovations herein to provide an optical device and an optical modulation apparatus, which are capable of overcoming the above drawbacks accompanying the related art. The above and other objects can be achieved by combinations described in the independent claims. The dependent claims define further advantageous and exemplary combinations of the innovations herein. According to a first aspect related to the innovations herein, provided is an optical device comprising a substrate; a dielectric film that is formed on the substrate and includes a first optical waveguide and a second optical waveguide that run parallel to each other; a transmission line that is formed on the dielectric film and includes a signal line arranged between the first optical waveguide and the second optical waveguide, a first bias electrode, and a second bias electrode, the first bias electrode and the second bias electrode arranged respectively in a first region that is on a side of the first optical waveguide opposite the second optical waveguide and a second region on a side of the second optical waveguide opposite the first optical waveguide; and a drive circuit section that respectively applies a first bias voltage and a second bias voltage differing from each other to the first bias electrode and the second bias electrode, and applies a control voltage that is between the first bias voltage and the second bias voltage to the signal line.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
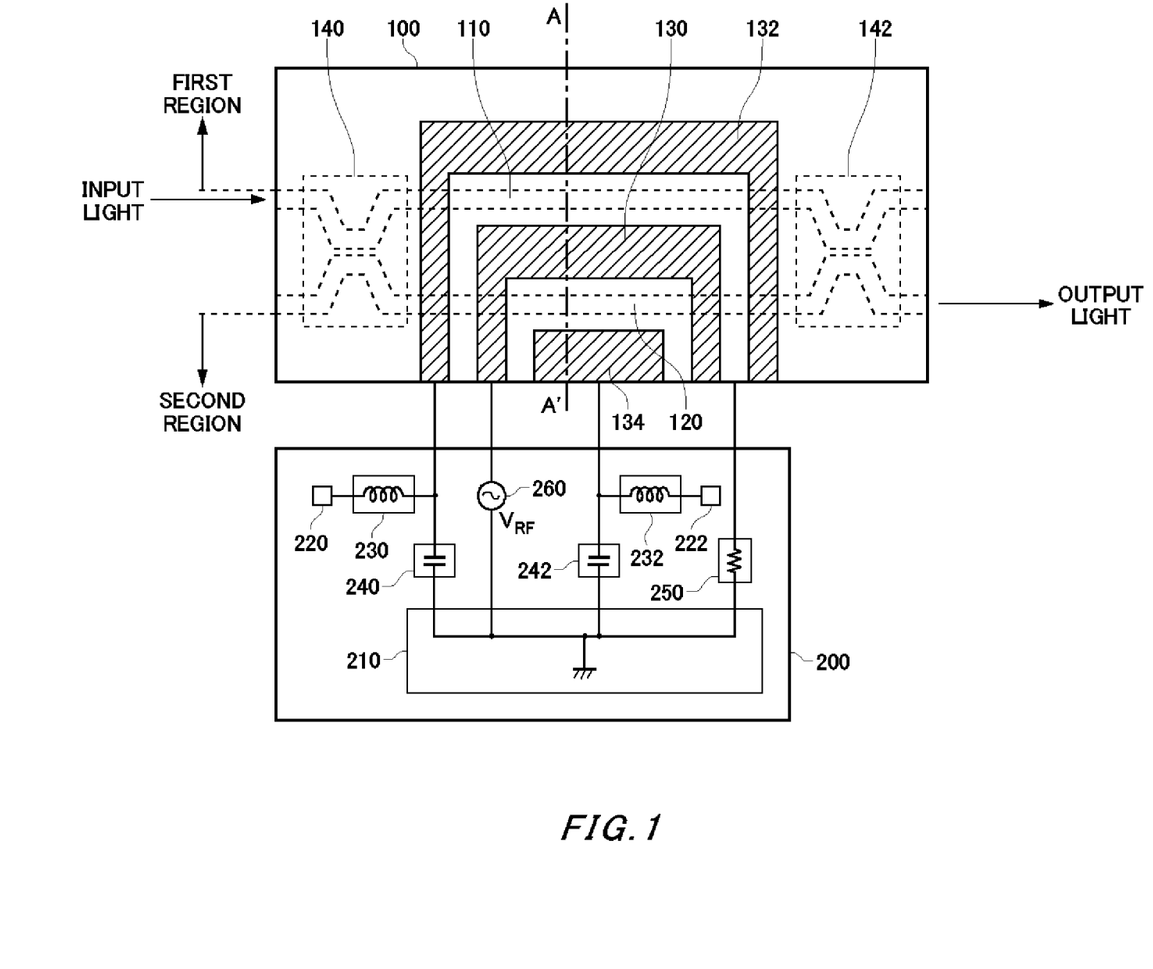
FIG. 1 shows an exemplary configuration of an optical device section 100 according to the present embodiment, along with a drive circuit section 200.

FIG. 1 shows an exemplary configuration of an optical device section 100 according to the present embodiment, along with a drive circuit section 200. The optical device section 100 includes a Mach-Zehnder optical waveguide formed by a ferroelectric crystal, which has a refractive index change relative to applied electric field strength differing from that of $LiNbO_3$ (LN), and a coplanar electrode that has a signal line and two bias applying electrodes sandwiching the signal line. The optical device section 100 efficiently applies a modulated electric field to the Mach-Zehnder optical waveguide to modulate input light according to the modulated electric field, and outputs the resulting light. The optical device section 100 includes a first optical waveguide 110, a second optical waveguide 120, a signal line 130, a first bias electrode 132, a second bias electrode 134, a first photocoupler 140, and a second photocoupler 142.

The first optical waveguide 110 and the second optical waveguide 120 have a ridge structure in which a cross section of a dielectric material is convex, and transmit light input thereto. The first optical waveguide 110 and the second optical waveguide 120 may be formed to have a convex shape with a height and width corresponding to the wavelength of light transmitted thereby.

The signal line 130 is arranged between the first optical waveguide 110 and the second optical waveguide 120. One end of the signal line 130 is connected to the frequency signal source 260, the other end of the signal line 130 is connected to the termination resistance 250, and the signal line 130 transmits a frequency signal input to one end thereof to the other.

The first bias electrode 132 is arranged in a region on the side of the first optical waveguide 110 opposite the second optical waveguide 120 and the signal line 130. The first bias electrode 132 has a first bias voltage applied thereto. The second bias electrode 134 is arranged in a region that is on the side of the second optical waveguide 120 opposite the first optical waveguide 110 and the signal line 130. The second bias electrode 134 has a second bias voltage applied thereto.

The signal line 130, the first bias electrode 132, and the second bias electrode 134 form a coplanar transmission line. In other words, the line width of the signal line 130, the interval between the signal line 130 and the first bias electrode 132, and the interval between the signal line 130 and the second bias electrode 134 are set to predetermined values according to the frequency of the signal transmitted by the signal line 130. As a result, the signal line 130 can transmit a signal with a high frequency up to tens of GHz.

The first photocoupler 140 branches the light input to the optical device section 100, and guides the light to the first optical waveguide 110 and the second optical waveguide 120. The second photocoupler 142 multiplexes the light from the first optical waveguide 110 and the second optical waveguide 120. The second photocoupler 142 outputs the multiplexed light as the output light of the optical device section 100.

The first photocoupler 140 and the second photocoupler 142 may each be a 3 dB photocoupler with two inputs and two outputs that branches, in a one-to-one manner, light input thereto from either of two input sections and outputs the light from each of the two output sections. Instead, the first photocoupler 140 may be an optical branching coupler with one input and two outputs and the second photocoupler 142 may be an optical multiplexing coupler with two inputs and one output. The first photocoupler 140 and the second photocoupler 142 may each be a multimode interferometer (MMI) coupler.

Here, the first optical waveguide 110, the second optical waveguide 120, the first photocoupler 140, and the second photocoupler 142 form a Mach-Zehnder optical waveguide. In other words, the optical device section 100 branches input light into two beams with the first photocoupler 140, transmits the two beams respectively to the first optical waveguide 110 and the second optical waveguide 120, multiplexes the two beams with the second photocoupler 142, and outputs the multiplexed light. The optical device section 100 modulates the phase of the light being transmitted, by applying an electric field to the first optical waveguide 110 and the second optical waveguide 120 according to a signal applied to the coplanar transmission path from the drive circuit section 200, and multiplexes the light with the second photocoupler 142, to output light that is intensity-modulated according to a phase difference.

The drive circuit section 200 applies a first bias voltage and a second bias voltage, which are different from each other, to the first bias electrode 132 and the second bias electrode 134, and applies a control voltage that is between the first bias voltage and the second bias voltage to the signal line 130. The drive circuit section 200 includes a reference voltage 210, a first power supply section 220, a second power supply section 222, a first inductor 230, a second inductor 232, a first capacitor 240, a second capacitor 242, a termination resistance 250, and a frequency signal source 260.

The reference voltage 210 supplies a predetermined voltage. In the present embodiment, the reference voltage 210 supplies a GND voltage of 0 V.

The first power supply section 220 supplies the first bias electrode 132 with the first bias voltage, via the first inductor 230. The first inductor 230 is connected between the first bias electrode 132 and the first power supply section 220 outputting the first bias voltage.

The first capacitor 240 is connected between the reference voltage 210 and the first bias electrode 132. As a result, the first bias electrode 132 connects the drive frequency component to the GND voltage, which is the reference voltage, with a low resistance while blocking the DC component.

The second power supply section 222 supplies the second bias electrode 134 with the second bias voltage, via the second inductor 232. The second inductor 232 is connected between the second bias electrode 134 and the second power supply section 222 outputting the second bias voltage.

The second capacitor 242 is connected between the reference voltage 210 and the second bias electrode 134. As a result, the second bias electrode 134 connects the drive frequency component to the GND voltage, which is the reference voltage, with a low resistance while blocking the DC component.

The termination resistance 250 is the termination of the signal line 130. For example, the signal line 130 may be a transmission line with a characteristic impedance of 50Ω and the resistance value of the termination resistance 250 may be 50Ω.

The frequency signal source 260 supplies the signal line 130 with a control signal that is a frequency signal having a predetermined frequency. The frequency signal source 260 may supply a frequency signal with a frequency up to tens of GHz.

In the manner described above, the first bias electrode 132 and the second bias electrode 134 are connected to the GND voltage with high frequency while the first bias voltage and the second bias voltage are being supplied, and the signal line 130 has one end that is a termination and another end from which a high frequency signal is supplied. In other words, the signal line 130, the first bias electrode 132, and the second bias electrode 134 function as a coplanar transmission line at the drive frequency supplied by the frequency signal source 260.

Figure 2:
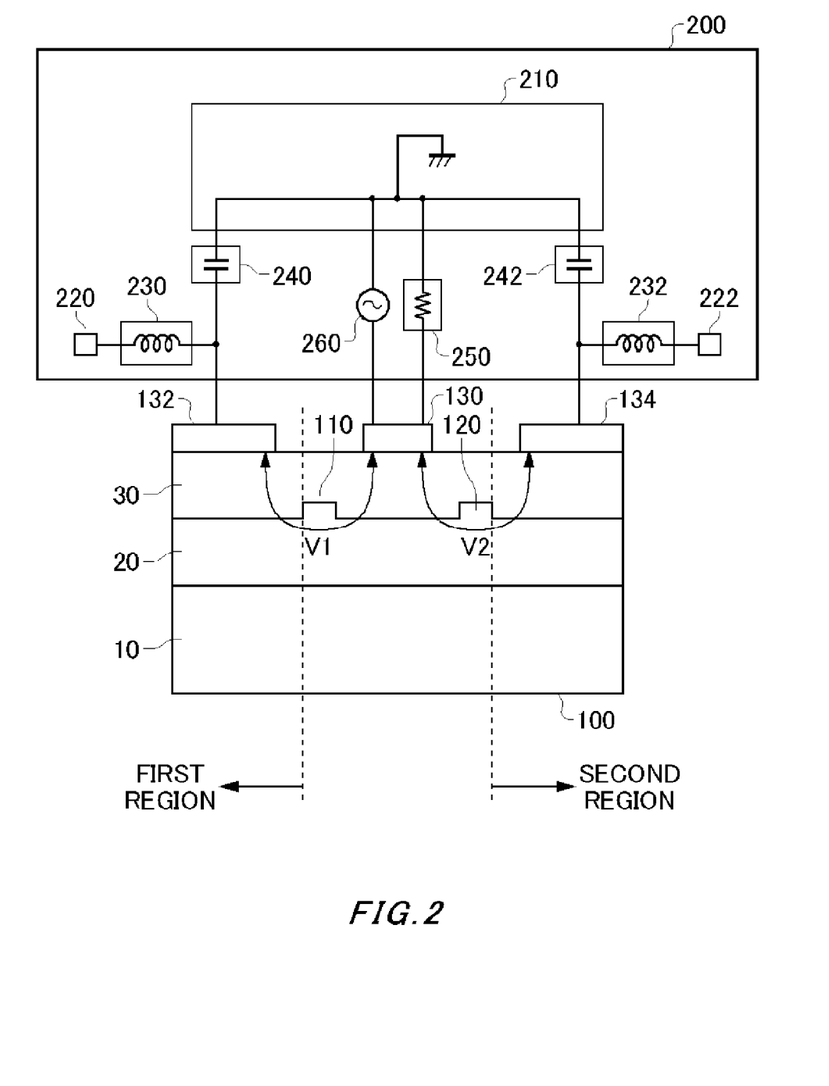
FIG. 2 shows a cross section over the line A-A' in FIG. 1, along with the drive circuit section 200.

FIG. 2 shows a cross section over the line A-A' in FIG. 1, along with the drive circuit section 200. In FIG. 2, components that are substantially the same as those in the optical device section 100 and the drive circuit section 200 according to the present embodiment shown in FIG. 1 are given the same reference numerals, and descriptions thereof are omitted. The optical device section 100 includes a substrate 10, a dielectric film 20, and an insulating film 30.

The substrate 10 is formed of a single-crystal material. For example, the substrate 10 may be an $Al_2O_3$ (sapphire) substrate or a MgO substrate. The substrate 10 may be a so-called R-cut sapphire substrate obtained by cutting and polishing such that the (1102) plane of a sapphire substrate is the primary surface.

Instead, the substrate 10 may be formed by layering some type of layers on a substrate. In other words, since the dielectric film 20 is deposited on the surface of the substrate 10, the substrate 10 may include a buffer layer for preventing scattering of the substrate material to the dielectric film 20 and/or for lattice matching with the dielectric film 20.

The dielectric film 20 is formed on the substrate 10 and includes the first optical waveguide 110 and the second optical waveguide 120 running parallel to each other. The dielectric film 20 includes the first photocoupler 140 and the second photocoupler 142 connected respectively to the first optical waveguide 110 and the second optical waveguide 120.

The dielectric film 20 is a ferroelectric thin film. The dielectric film 20 may be formed using epitaxial growth. The dielectric film 20 may be a thin film with a thickness of 10 μm or less, for example. The dielectric film 20 may form a core material of an optical waveguide that transmits light having a wavelength used in 850 nm band, 1300 nm band, and 1500 nm band optical communication. The dielectric film 20 may have a thickness that is determined based on the wavelength of the light to be transmitted.

The dielectric film 20 is a ferroelectric thin film such as a PZT thin film, a PLZT thin film, or a $BaTiO_3$ thin film. A PLZT crystal, a PZT crystal, and a $BaTiO_3$ crystal, for example, are ferroelectric crystals having a Perovskite structure, which is one type of crystal structure, that changes to a tetragonal crystal, an orthorhombic crystal, a rhombohedral crystal, or a cubic crystal depending on temperature and material composition. However, when PLZT crystals or the like are deposited and grown on a certain substrate, the lattice constant of the substrate material differs from the lattice constant of the bulk single crystal substrate, and therefore the crystal structure can change when stress is applied to the thin film.

For example, when a PLZT thin film is formed as the dielectric film 20 on a sapphire (1102) substrate, the PLZT thin film has a preferred orientation in the <110> direction. In this way, when the dielectric film 20 is formed as a crystal with a suitable structure on a substrate 10 selected to have a suitable crystal orientation direction, the crystal becomes oriented parallel to the surface of the substrate 10, and therefore the direction of the intrinsic polarization can be made parallel to the surface of the substrate 10. As a result, the optical device section 100 can provide a substrate suitable for a device that applies an electric field parallel to the easy axis of polarization of the PLZT thin film.

The insulating film 30 is formed on the dielectric film 20. The insulating film 30 may include $SiO_2$ or $SiN_x$. The insulating film 30 may be a low-dielectric-constant film that has a lower dielectric constant than the dielectric film 20. The substrate 10 may also have a lower dielectric constant than the dielectric film 20. For example, the insulating film 30 and the substrate 10 may each have a dielectric constant of 10 or less, and the dielectric film 20 may have a dielectric constant that is from several hundred to several thousand.

As a result, the dielectric film 20 having a high dielectric constant is formed between the substrate 10 and the insulating film 30 having low dielectric constants and low refractive indexes, thereby forming the first optical waveguide 110 and the second optical waveguide 120 that can efficiently capture light. Furthermore, when a modulated signal is supplied to the optical device section 100 and the optical device section 100 is used as a modulator, the optical device section 100 can perform speed matching of matching the transmission speed of the modulated signal to the transmission speed of a light wave transmitted through the first optical waveguide 110 and the second optical waveguide 120, by changing the thickness and material of the substrate 10 and the insulating film 30 to obtain an effective dielectric constant. Furthermore, the substrate 10 and the insulating film 30 can set the characteristic impedance of the transmission line on which the modulated signal is transmitted to be a predetermined value such as 50Ω, for example.

The coplanar transmission line including the signal line 130, the first bias electrode 132, and the second bias electrode 134 is formed on the insulating film. The transmission line may be formed of metal, including gold. The transmission line applies an electric field that is parallel to the surface of the substrate 10 to the first optical waveguide 110 and the second optical waveguide 120. For example, the signal line 130 and the first bias electrode 132 may apply an electric field corresponding to the inter-electrode voltage shown by V1 in FIG. 2 to the first optical waveguide 110, and the signal line 130 and the second bias electrode 134 apply an electric field corresponding to the inter-electrode voltage shown by V2 in FIG. 2 to the second optical waveguide 120.

Figure 3:
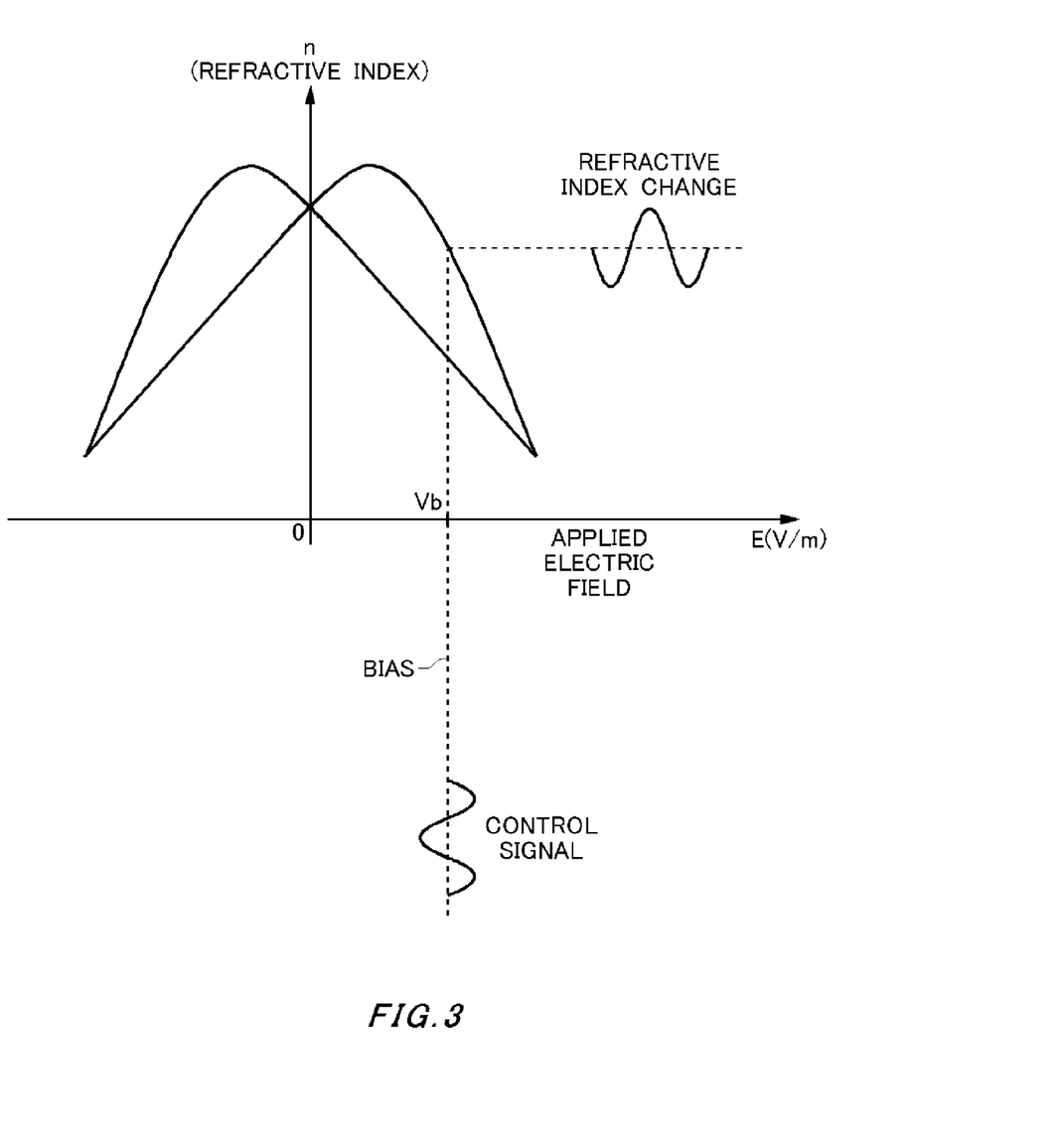
FIG. 3 shows exemplary change in the refractive index with respect to the applied electric field of the dielectric film 20 according to the present embodiment.

FIG. 3 shows exemplary change in the refractive index with respect to the applied electric field of the dielectric film 20 according to the present embodiment. In FIG. 3, the horizontal axis indicates the strength of the applied electrical field generated according to the voltage applied to the dielectric film 20, and the vertical axis indicates change of the refractive index relative to the applied electric field of the dielectric film 20.

The dielectric film 20, which is formed of PLZT crystal, PZT crystal, or $BaTiO_3$ crystal, for example, exhibits polarization inversion according to the applied electric field, and therefore, unlike LN crystal or the like in which the change in refractive index is linear with respect to the applied electric field, the dielectric film 20 exhibits a complicated refractive index change, such as a butterfly shape, with respect to the applied electric field. Accordingly, when a sinusoidal voltage is applied to the dielectric film 20 as the control signal, the change in the refractive index is distorted from the form of a sinusoidal wave, unless an offset voltage is added. Here, a dielectric film that has intrinsic polarization and polarity that inverts with respect to the applied electric field is referred to as a "ferroelectric film."

On the other hand, when LN crystal or the like that exhibits linear refractive index change in a positive and negative applied electric field range is used as an optical modulator by forming a Mach-Zehnder optical waveguide, there is a known method for modulation that includes forming a coplanar transmission line that includes ground (G), signal (S), and ground (G) electrodes. With such an LN optical modulator, the S electrode is arranged between the two optical waveguides running parallel in the Mach-Zehnder optical waveguide to apply a control signal, and the two parallel optical waveguides respectively have electric fields in opposite directions applied thereto. In other words, the light beams passed through the two parallel optical waveguides have their phases changed in opposite directions, thereby achieving the optical modulation.

However, as shown in FIG. 3, for a ferroelectric such as PLZT, the slope of the refractive index in a positive applied electric field range and the slope of the refractive index in a negative applied electric field range change in almost the same manner, with respect to change in the absolute value of the applied electric field strength. An optical device using such a ferroelectric causes electric fields having the same direction to be applied to the two parallel optical waveguides when the optical device is used in a GSG coplanar transmission line in the same manner as the LN optical modulator. In other words, the light beams passed by the two parallel optical waveguides each undergo a phase change in the same direction, and so there is no phase difference therebetween. Therefore, the optical device using a ferroelectric such as PLZT exhibits unreliable operation when used as an optical modulator or an optical switch, or cannot achieve such operation at all.

In contrast, the drive circuit section 200 of the present embodiment adds a bias voltage $V_b$, which is an offset voltage, to the control signal and applies the resulting signal to the dielectric film 20. The bias voltage $V_b$ may be determined in advance such that, even if the bias voltage is increased or decreased by the voltage amplitude of the control signal, the refractive index change of the dielectric film 20 remains almost linear. For example, when the voltage amplitude of the control signal is 20 V, $V_b$ is set to 100 V such that the refractive index change of the dielectric film 20 is approximately linear in a range from 80 V to 120 V.

By applying the bias voltage $V_b$ in this way, the dielectric film 20 can exhibit a refractive index change characteristic that resembles the applied control signal. The dielectric film 20 shown in the example of FIG. 3 exhibits a refractive index change with a negative slope relative to the applied electric field, and therefore the phase inverts with respect to a sinusoidal control signal applied to the dielectric film 20.

Figure 4:
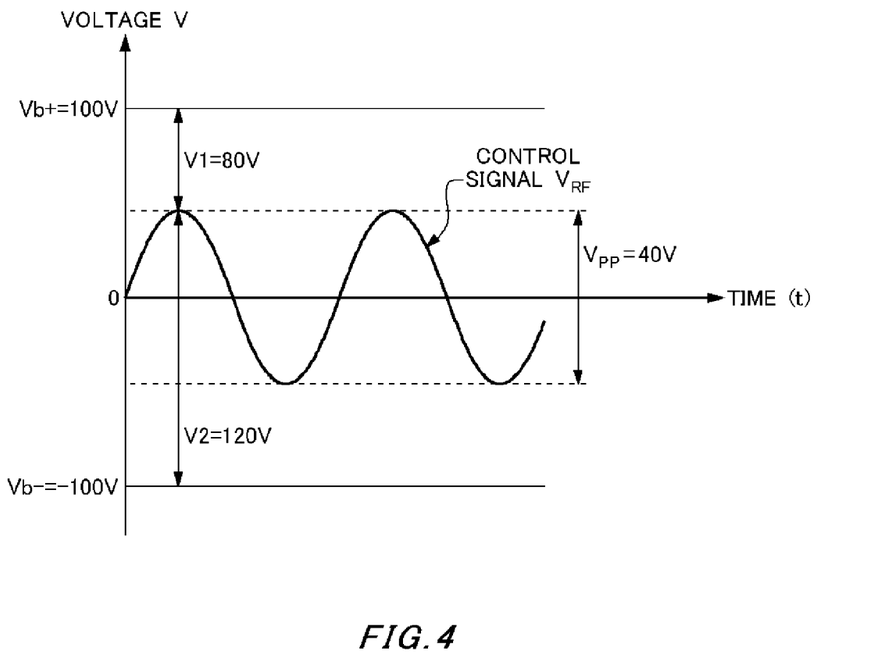
FIG. 4 shows an exemplary drive voltage $V_{RF}$ of the drive circuit section 200 according to the present embodiment.

FIG. 4 shows an exemplary drive voltage $V_{RF}$ of the drive circuit section 200 according to the present embodiment. In FIG. 4, the horizontal axis indicates time and the vertical axis indicates voltage. The first bias electrode 132 is an electrode to which a positive bias is applied as the first bias voltage, and the second bias electrode 134 is an electrode to which a negative bias is applied as the second bias voltage.

As an example, the first power supply section 220 supplies the first bias electrode 132 with $V_{b+}$ of 100 V as a first bias voltage, and the second power supply section 222 supplies the second bias electrode 134 with $V_{b-}$ of −100 V as a second bias voltage. The frequency signal source 260 applies to the signal line 130 a sinusoidal signal $V_{RF}$ with an amplitude of 20 V, which is a control signal between the first bias voltage $V_{b+}$ and the second bias voltage $V_{b-}$.

Accordingly, the inter-electrode voltage $V_1$ $(=V_{b+}-V_{RF})$, which is between the first bias electrode 132 to which the first bias voltage $V_{b+}$ is applied and the signal line 130 to which the sinusoidal signal $V_{RF}$ is applied, is applied to the first optical waveguide 110. Similarly, the inter-electrode voltage $V_2$ $(=V_{RF}-V_{b-})$, which is between the second bias electrode 134 to which the second bias voltage $V_{b-}$ is applied and the signal line 130 to which the sinusoidal signal $V_{RF}$ is applied, is applied to the second optical waveguide 120.

Figure 5:
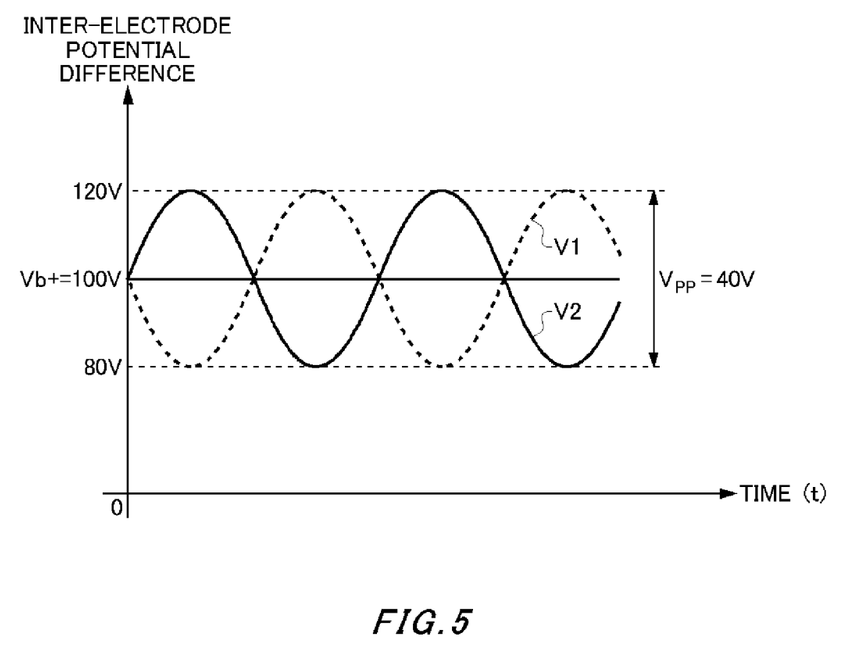
FIG. 5 shows an exemplary inter-electrode voltage of the optical device section 100 according to the present embodiment.

FIG. 5 shows an exemplary inter-electrode voltage of the optical device section 100 according to the present embodiment. In FIG. 5, the horizontal axis indicates time and the vertical axis indicates voltage. The inter-electrode voltage $V_1$ $(=V_{b+}-V_{RF})$ has a waveform of a sinusoidal signal obtained by inverting, by 180 degrees, a sinusoidal signal whose amplitude increases or decreases by 20 V from a central point of $V_{b+}$ (100 V). Furthermore, the inter-electrode voltage $V_2$ $(=V_{RF}-V_{b-})$ has a waveform of a sinusoidal signal whose amplitude increases or decreases by 20 V from a central point of $-V_{b-}$, which is equal to $V_{b+}$ (100 V).

In other words, the drive circuit section 200 can apply electric fields with inverse phases respectively to the first optical waveguide 110 and the second optical waveguide 120 of the optical device section 100. In this way, by performing push-pull driving of the first optical waveguide 110 and the second optical waveguide 120, the drive circuit section 200 can cause the phase difference between the two beams of light transmitted respectively on the two optical waveguides to be approximately double the phase difference achieved by one-sided driving in which an electric field is applied to only one of the first optical waveguide 110 and the second optical waveguide 120.

In this way, by using a control signal from one frequency signal source 260, the drive circuit section 200 can perform push-pull driving of the first optical waveguide 110 and the second optical waveguide 120 formed of PLZT, for example, to efficiently apply the electric fields. As a result, the optical device section 100 and the drive circuit section 200 can perform optical modulation without using a plurality of bias tees, additional circuits, or differential signal drivers, for example.

For a Mach-Zehnder optical device that uses a PLZT crystal or the like having a refractive index that changes in a complicated manner with respect to the applied electric field strength, the optical device section 100 and the drive circuit section 200 of the present embodiment described above can form coplanar electrodes and transmit a high-speed control signal to apply electric fields with inverse phases respectively to two optical waveguides, according to a control signal. As a result, the optical device section 100 can operate as an optical modulator that tracks a control signal having a frequency of tens of GHz.

The above embodiment describes an example in which the optical device section 100 includes the insulating film 30 and performs speed matching by matching the transmission speed of the modulated signal with the transmission speed of a light wave transmitted by the first optical waveguide 110 and the second optical waveguide 120. Instead, if the control signal is less than several GHz, for example, and speed matching is not necessary, the optical device section 100 need not include the insulating film 30. In this case, the transmission line including the signal line 130, the first bias electrode 132, and the second bias electrode 134 is formed on the dielectric film 20.

Figure 6:
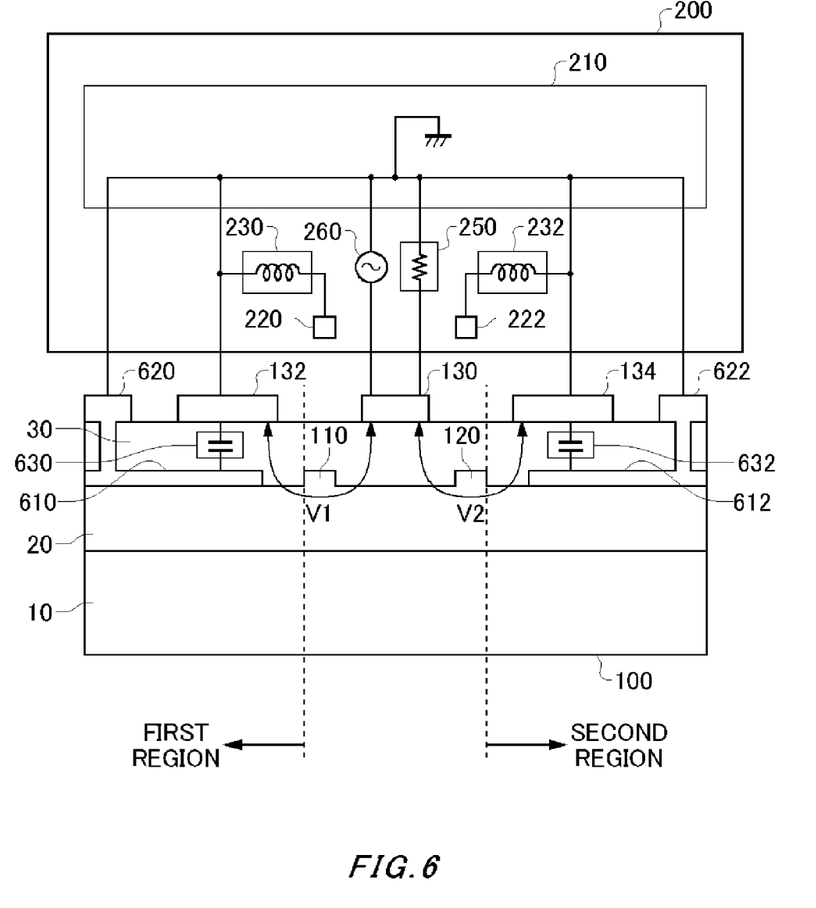
FIG. 6 shows an exemplary modification of the optical device section 100 according to the present embodiment, along with the drive circuit section 200.

FIG. 6 shows an exemplary modification of the optical device section 100 according to the present embodiment, along with the drive circuit section 200. In FIG. 6, components that are substantially the same as those of the optical device section 100 and the drive circuit section 200 described in FIGS. 1 and 2 are given the same reference numerals, and descriptions thereof are omitted. In the present modification, the optical device section 100 includes ground electrodes 610 and 612, external electrode sections 620 and 622, a third capacitor 630, and a fourth capacitor 632.

The ground electrode 610 is formed in a region on a side of the first optical waveguide 110 opposite the signal line 130 and the second optical waveguide 120, either within the insulating film 30 or in contact with the dielectric film 20, and is connected to the predetermined reference voltage. The ground electrode 612 is formed in a region on a side of the second optical waveguide 120 opposite the signal line 130 and the first optical waveguide 110, either within the insulating film 30 or in contact with the dielectric film 20, and is connected to the predetermined reference voltage.

The external electrode section 620 is formed on the insulating film 30 and is electrically connected to the ground electrode 610. The external electrode section 620 is connected to the reference voltage 210 of the drive circuit section 200. The external electrode section 622 is formed on the insulating film 30 and electrically connected to the ground electrode 612. The external electrode section 622 is connected to the reference voltage 210 of the drive circuit section 200.

The third capacitor 630 is connected between the first bias electrode 132 and the ground electrode 610. The third capacitor 630 may include two electrode films formed of metal within the insulating film 30, and the insulating material within these electrode films may be a dielectric. Instead, the third capacitor 630 may include one electrode film formed of metal within the insulating film 30, and the insulating material between this electrode film and the ground electrode 610 may be a dielectric.

The fourth capacitor 632 is connected between the second bias electrode 134 and the ground electrode 612. The fourth capacitor 632 may include two electrode films formed of metal within the insulating film 30, and the insulating material within these electrode films may be a dielectric. Instead, the fourth capacitor 632 may include one electrode film formed of metal within the insulating film 30, and the insulating material between this electrode film and the ground electrode 612 may be a dielectric.

In this way, the optical device section 100 of the present modification forms capacitors using a portion of the insulating material of the insulating film 30 within the insulating film 30. As a result, the first capacitor 240 and the second capacitor 242 of the drive circuit section 200 can be omitted.

The above embodiment describes an example in which the drive circuit section 200 includes a frequency signal source 260 and supplies a frequency signal having a predetermined frequency to the signal line 130. Instead, the drive circuit section 200 may include a pulse signal source or a switching circuit, for example, and supply the signal line 130 with a pulse signal or a switching control signal. In this way, the optical device section 100 can operate as an optical switch that switches whether input light is output, according to the pulse signal or the switching control signal.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. An optical device comprising:
   a substrate;
   a dielectric film that is formed on the substrate and includes a first optical waveguide and a second optical waveguide;
   a transmission line that is formed on the dielectric film and includes a signal line arranged between the first optical waveguide and the second optical waveguide, a first bias electrode arranged on a side of the first optical waveguide that is opposite the second optical waveguide and a second bias electrode arranged on a side of the second optical waveguide that is opposite the first optical waveguide; and
   a drive circuit section that applies a first bias voltage to the first bias electrode, a second bias voltage that is different from the first bias voltage to the second bias electrode, and applies a control voltage that is between the first bias voltage and the second bias voltage to the signal line, the drive circuit section including:
      a first capacitor connected between a predetermined reference voltage and the first bias electrode,
      a second capacitor connected between the predetermined reference voltage and the second bias electrode, and
      a frequency signal source that supplies the signal line with a frequency signal having a predetermined frequency,
   wherein the first and second bias electrodes connect the frequency signal source to the predetermined reference voltage, with a low resistance, while blocking the first and second bias voltages, respectively.

2. The optical device according to claim 1, further comprising an insulating film that is formed on the dielectric film, wherein the transmission line is formed on the insulating film.

3. The optical device according to claim 2, wherein the signal line, the first bias electrode, and the second bias electrode form a coplanar transmission line.

4. The optical device according to claim 2, wherein the dielectric film further includes a first photocoupler operable to split and guide a light to the first optical waveguide and the second optical waveguide, and a second photocoupler that combines the light from the first optical waveguide and the second optical waveguide, the first optical waveguide, the second optical waveguide, the first photocoupler, and the second photocoupler forming a Mach-Zehnder optical waveguide.

5. The optical device according to claim 2, wherein the first bias electrode has a positive bias applied thereto as the first bias voltage, and the second bias electrode has a negative bias applied thereto as the second bias voltage.

6. The optical device according to claim 2, wherein the substrate is formed of a single-crystal material.

7. The substrate according to claim 6, wherein the substrate is a sapphire substrate or a MgO substrate.

8. The optical device according to claim 2, wherein the dielectric film is a ferroelectric thin film.

9. The optical device according to claim 8, wherein the ferroelectric thin film is a PZT thin film, a PLZT thin film, or a $BaTiO_3$ thin film, which have Perovskite crystal structures.

10. The optical device according to claim 2, wherein the insulating film includes $SiO_2$ or $SiN_x$.

11. The optical device according to claim 2, further comprising:
    a third capacitor connected between the first bias electrode and a first ground electrode; and
    a fourth capacitor connected between the second bias electrode and a first ground electrode;
    wherein each ground electrode is provided within the insulating film or in contact with the dielectric film and connected to the predetermined reference voltage.

* * * * *